(12) United States Patent
Heck

(10) Patent No.: US 11,021,250 B2
(45) Date of Patent: Jun. 1, 2021

(54) AIRBORNE FIRE EXTINGUISHING SYSTEM WITH INFRARED IMAGING AND METHOD

(71) Applicant: Kenneth Heck, Mountain View County (CA)

(72) Inventor: Kenneth Heck, Mountain View County (CA)

(*) Notice: Subject to any disclaimer, the term of this patent is extended or adjusted under 35 U.S.C. 154(b) by 0 days.

(21) Appl. No.: 15/710,614

(22) Filed: Sep. 20, 2017

(65) Prior Publication Data

US 2019/0084678 A1 Mar. 21, 2019

(51) Int. Cl.
*B64D 1/18* (2006.01)
*G01J 5/00* (2006.01)
*A62C 3/02* (2006.01)
*A62C 37/40* (2006.01)

(52) U.S. Cl.
CPC .............. *B64D 1/18* (2013.01); *A62C 3/0242* (2013.01); *A62C 37/40* (2013.01); *G01J 5/0014* (2013.01)

(58) Field of Classification Search
CPC ..... A62C 3/0242; A62C 31/005; A62C 31/02; A62C 31/03; A62C 31/28; A62C 37/36; A62C 37/40; B64D 1/16; B64D 1/18; B64D 47/08; B05B 1/26–267
USPC ........................................... 169/53; 239/171
See application file for complete search history.

(56) References Cited

U.S. PATENT DOCUMENTS

| 1,604,290 | A | * | 10/1926 | King | B64D 1/16 169/53 |
| 4,090,567 | A | * | 5/1978 | Tomlinson | B64D 1/16 169/53 |
| 5,135,055 | A | * | 8/1992 | Bisson | A62C 3/00 169/53 |
| 5,385,208 | A | * | 1/1995 | Baker | A62C 3/0242 169/46 |
| 2005/0072880 | A1 | * | 4/2005 | Nolan | B64D 1/16 244/136 |
| 2005/0178565 | A1 | * | 8/2005 | Voss | A62C 3/0242 169/53 |
| 2008/0210002 | A1 | * | 9/2008 | Kamiunten | G01F 1/6847 73/204.23 |
| 2013/0199806 | A1 | * | 8/2013 | Zimmerman | A62C 3/0242 169/53 |
| 2014/0145007 | A1 | * | 5/2014 | Thompson | B05B 1/14 239/171 |

(Continued)

FOREIGN PATENT DOCUMENTS

GB 2106385 A * 4/1983 ............... A62C 3/00

*Primary Examiner* — Cody J Lieuwen
(74) *Attorney, Agent, or Firm* — Argus Intellectual Enterprise; Jordan Sworen; Daniel Enea

(57) ABSTRACT

An airborne fire extinguishing system includes a fluid reservoir, a flow control valve in fluid communication with the fluid reservoir, a deflector in fluid communication with the flow control valve, and an infrared camera. The fluid reservoir is configured to contain a fire extinguishing agent for suppressing a fire, particularly water. The flow control valve regulates a flow of the fire extinguishing agent between the fluid reservoir and the deflector. The deflector dispenses the fire extinguishing agent in a controlled manner such that the fire extinguishing agent is diffused in a specified concentration into the air. The infrared camera is configured to produce a thermographic image resulting from thermal radiation produced by a fire to help provide targeting means.

19 Claims, 5 Drawing Sheets

(56) References Cited

U.S. PATENT DOCUMENTS

| | | | |
|---|---|---|---|
| 2016/0271434 A1* | 9/2016 | Dusing | A62C 37/40 |
| 2017/0009904 A1* | 1/2017 | McLoughlin | G05D 7/0635 |
| 2017/0128759 A1* | 5/2017 | Zonio | A62C 31/00 |
| 2017/0151455 A1 | 6/2017 | Pigeon | |
| 2018/0075762 A1* | 3/2018 | Gadgil | G08G 5/0078 |
| 2018/0078801 A1* | 3/2018 | Perkovich | A62C 3/02 |
| 2018/0319499 A1* | 11/2018 | Holly | B64C 39/024 |

* cited by examiner

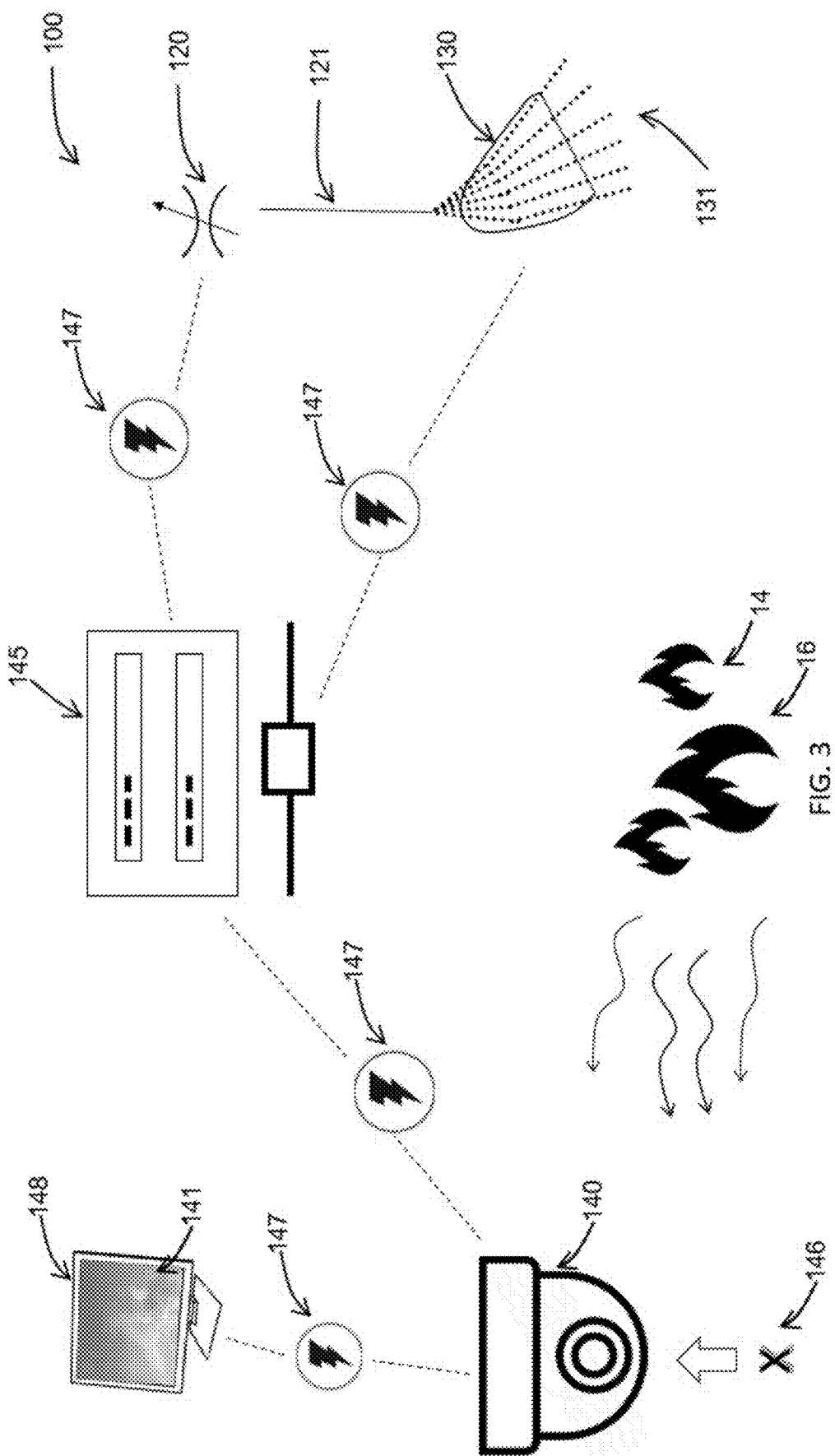

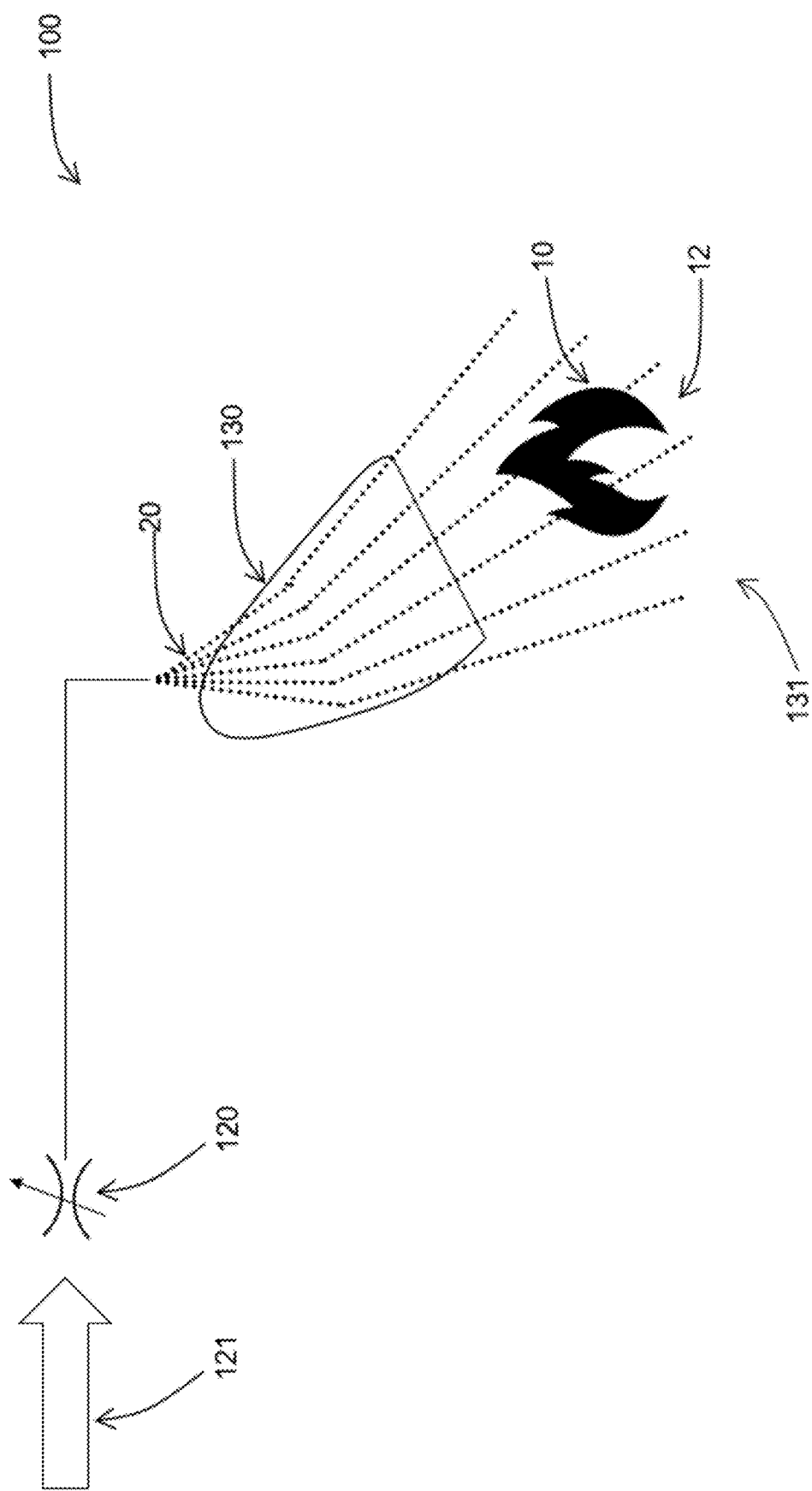

```
          ┌──────────────┐
          │  PROVIDING   │ ← 501          ← 100
          └──────┬───────┘
                 ↓                        ← 500
          ┌──────────────┐
          │  GENERATING  │ ← 502
          └──────┬───────┘
                 ↓
          ┌──────────────┐
          │  DIRECTING   │ ← 503
          └──────┬───────┘
                 ↓
          ┌──────────────┐
          │  DISPERSING  │ ← 504
          └──────┬───────┘
                 ↓
          ┌──────────────┐
          │  VAPORIZING  │ ← 505
          └──────┬───────┘
                 ↓
          ┌──────────────┐
          │   REMOVING   │ ← 506
          └──────┬───────┘
                 ↓
          ┌──────────────┐
          │  SMOTHERING  │ ← 507
          └──────┬───────┘
                 ↓
```

FIG. 5

AIRBORNE FIRE EXTINGUISHING SYSTEM WITH INFRARED IMAGING AND METHOD

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of fire extinguishing means of existing art and more specifically relates to aerial firefighting.

RELATED ART

Aerial firefighting is the use of aircraft and other aerial resources to combat wildfires. The types of aircraft used include fixed-wing aircraft and helicopters. Smokejumpers and rappellers are also classified as aerial firefighters, delivered to the fire by parachute from a variety of fixed-wing aircraft, or rappelling from helicopters. Chemicals used to fight fires may include water, water enhancers such as foams and gels, and specially formulated fire retardants. The terms airtanker or air tanker generally refer to fixed-wing aircraft used in aerial firefighting.

Helicopters can hover over the fire and drop water or retardant. The S-64 Helitanker has microprocessor-controlled doors on its tank. The doors are controlled based on the area to be covered and wind conditions. Fixed-wing aircraft must make a pass and drop water or retardant like a bomber. Spotter (Air Tactical Group Supervisor) aircraft often orbit the fire at a higher altitude to coordinate the efforts of the smoke jumper, helicopter, media, and retardant-dropping aircraft; while lead planes fly low-level ahead of the airtankers to mark the trajectory for the drop, and ensure overall safety for both ground-based and aerial firefighters. Water is usually dropped directly on flames because its effect is short-lived. Fire retardants are typically dropped ahead of the moving fire or along its edge and may remain effective for two or more days. This can create artificial firebreaks where the terrain is too rugged or remote for ground crews to cut fireline. Aerial firefighting is most effectively used in conjunction with ground-based efforts, as aircraft are only one weapon in the firefighting arsenal. However, there have been cases of aircraft extinguishing fires long before ground crews were able to reach them.

U.S. Pub. No. 2017/0151455 to Jeffery J. Pidgeon relates to a fire sprinkler system. The described fire sprinkler system includes a fire suppression system in which side-discharge fire sprinklers are fitted to opposite sides of a supply line and aimed so that their coverage areas point in opposite directions. The fire sprinklers are alternated on left and right-hand sides of the supply line, and are spaced apart at a consistent interval. Each fire sprinkler includes a deflector configured to disperse the outflow of water over a non-circular coverage area. When two supply lines are installed next to each other so that half of the sprinklers on one supply line point toward the other supply line, and vice versa, the fire sprinklers are staggered so that their respective coverage areas are interlaced in the intermediate space.

SUMMARY OF THE INVENTION

In view of the foregoing disadvantages inherent in the known aerial firefighting art, the present disclosure provides a novel airborne fire extinguishing system with infrared imaging and method. The general purpose of the present disclosure, which will be described subsequently in greater detail, is to provide an airborne fire extinguishing system with infrared imaging and method efficient and safe for use.

An airborne fire extinguishing system is disclosed herein. The airborne fire extinguishing system includes a fluid reservoir, a flow control valve in fluid communication with the fluid reservoir, a deflector in fluid communication with the flow control valve, and an infrared camera. The fluid reservoir may removably contain a fire extinguishing agent for suppressing a fire, particularly water. The flow control valve may regulate a flow of the fire extinguishing agent between the fluid reservoir and the deflector. The deflector is an angled shield positioned below the flow control valve. The deflector may dispense the fire extinguishing agent in a controlled manner such that the fire extinguishing agent is deflected in a specified concentration onto the fire. The infrared camera is configured to produce a thermographic image resulting from thermal radiation produced by a fire. A signal produced by the infrared camera may influence the function of the flow control valve and the deflector, particularly the concentration by which the fire extinguishing agent is applied.

According to another embodiment, a method for extinguishing a fire from an aircraft is also disclosed herein. The method for extinguishing a fire from an aircraft includes providing the before-mentioned system equipped in an aircraft, generating an infrared image from the infrared camera and displaying it to a pilot of the aircraft to identify a heat concentration within the fire as a target; directing the aircraft to the heat concentration; dispersing the fire extinguishing agent from the deflector over a fire (as per directed target), such that the fire extinguishing agent is concentrated sufficiently to vaporize at the base of the fire; vaporizing the fire extinguishing agent at the base of the fire; removing a concentration of oxygen from the fire by displacing it with a vapor produced by the fire extinguishing agent; and smothering and extinguishing the fire.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an airborne fire extinguishing system with infrared imaging and method, constructed and operative according to the teachings of the present disclosure.

FIG. 3 is a perspective view of the process control system of the airborne fire extinguishing system of FIG. 1 detailing the functionality of the infrared cameras, according to an embodiment of the present disclosure.

FIG. 4 is a perspective view demonstrating the functionality of the flow control valve and the deflector of the airborne fire extinguishing system of FIG. 1, according to an embodiment of the present disclosure.

FIG. 5 is a flow diagram illustrating a method of use for extinguishing a fire from an aircraft, according to an embodiment of the present disclosure.

The various embodiments of the present invention will hereinafter be described in conjunction with the appended drawings, wherein like designations denote like elements.

DETAILED DESCRIPTION

Figure 1:
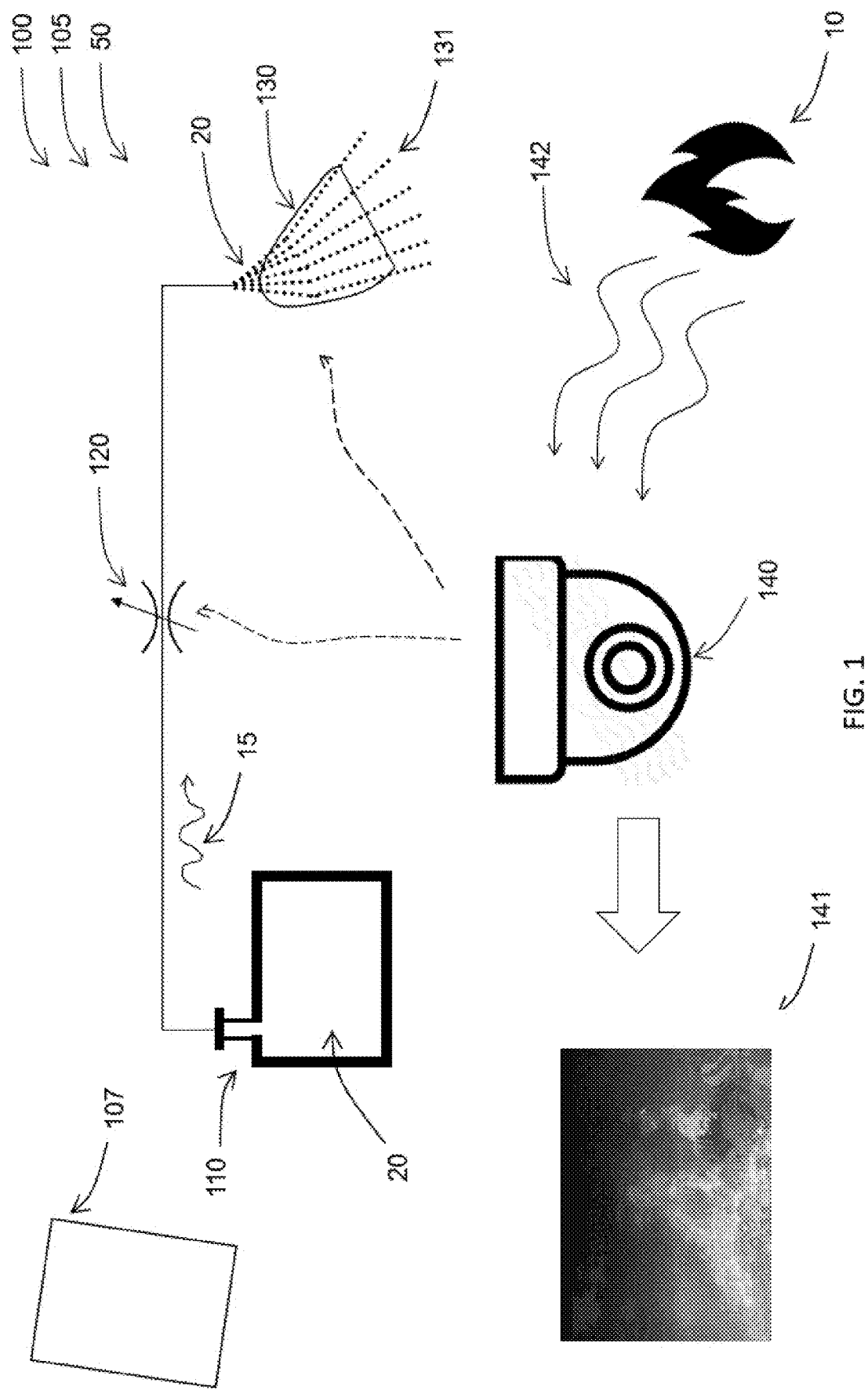
FIG. 1 is a view of the airborne fire extinguishing system as used, according to an embodiment of the disclosure.

As discussed above, embodiments of the present disclosure relate to a fire extinguisher and more particularly to an airborne fire extinguishing system with infrared imaging and method as used to improve the effectiveness and efficiency of aerial firefighting.

Generally, the airborne fire extinguishing system may be used for dispensing a fire extinguishing agent over a fire from the air. The fire extinguishing system may be integrated into an aircraft and includes a fluid reservoir, a flow control valve, and a deflector in fluid communication with one another. Preferably, the fire extinguishing agent is water or other such suitable fluid mixture. The system further includes one or more infrared cameras which generate thermographic images from a fire which the aircraft is passing over. The infrared camera is integrated into the fire extinguishing system to serve control functions, such as adjustable parameters of the flow control valve and the deflector. The system is advantageous in that in provides a pilot of a firefighting aircraft with improved information about the fire below due to information obtained through the thermographic images, as well as improved control over the dispersion of the fire extinguishing agent (targeted).

The infrared cameras are disposed on an underside of the aircraft so that images of the fire may be obtained while the aircraft is flying overhead. The infrared camera may transmit a feedback signal, which may generate a thermographic image to be displayed in a cockpit to be viewed by the pilot operating the aircraft. In this way, a pilot may use the thermographic image to identify the highest heat concentrations of a fire below and target these spots when dispensing the fire extinguishing agent. Preferably, the front infrared camera is configured to determine a temperature of the fire, while the rear infrared camera is configured to determine an output flow rate of the deflector. In some embodiments, the feedback signal produced by the infrared camera may be sent to a control system which adjusts the parameters of the flow control valve and the deflector.

The flow control valve may be adjusted to alter the flow rate of fire extinguishing agent provided to the deflector. Additionally, the deflector may be adjusted to change a spray pattern of the fire extinguishing agent. The deflector comprises an angled shield positioned below the flow control valve to alter the spray pattern of the fire extinguishing agent. Preferably, the deflector is an aluminum shield. Both of these parameters may be automatically adjusted by the control system in response to information obtained by the infrared cameras. For example, the control system may increase the flow rate of fire extinguishing agent provided to the deflector in response to an increase in heat of the fire below the aircraft.

Preferably, the fluid control valve is a globe valve. The size of the globe valve may vary depending on the application of the airborne fire extinguishing system. The globe valve is disposed on the underside of the aircraft, facing downwardly. The globe valve includes an aperture, a valve stem passing through the center of the aperture, a plug attached to one end of the valve stem, and a lift cage suspending the globe valve within the aircraft. In a closed position, the plug abuts the aperture, preventing fluid flow. When actuated, the valve stem lifts the plug, causing the plug to separate from the aperture, thereby enabling fluid flow in increasing proportions as the plug is lifted. As the valve opens, gravity causes fluid to flow from the globe valve downwardly to the deflector.

The airborne fire extinguishing system further includes a hydraulic opener configured to open and close the globe valve. The hydraulic opener is configured to actuate the valve stem of the globe valve in order to separate the plug from the aperture. The process control system may adjust the hydraulic opener, such that the output flow rate of the deflector is adjusted in response to the temperature of the fire, as measured by the infrared cameras.

In use, the flow control valve and deflector are adjusted to provide a fire extinguishing agent concentration and spread which is configured to disperse the fire extinguishing agent over a wide area. Additionally, the concentration of the fire extinguishing agent is configured to be low enough that the fire extinguishing agent is vaporized above the base of the fire. Accordingly, the fire extinguishing agent will be converted to steam when dispensed on the fire. The steam displaced oxygen above the fire, effectively smothering the fire. This means and method provides a more effective means of fire suppression than dumping a concentrated load of fire extinguishing agent over a fire.

Referring now more specifically to the drawings by numerals of reference, there is shown in FIGS. 1-4, various views of an airborne fire extinguishing system 100.

Figure 2:
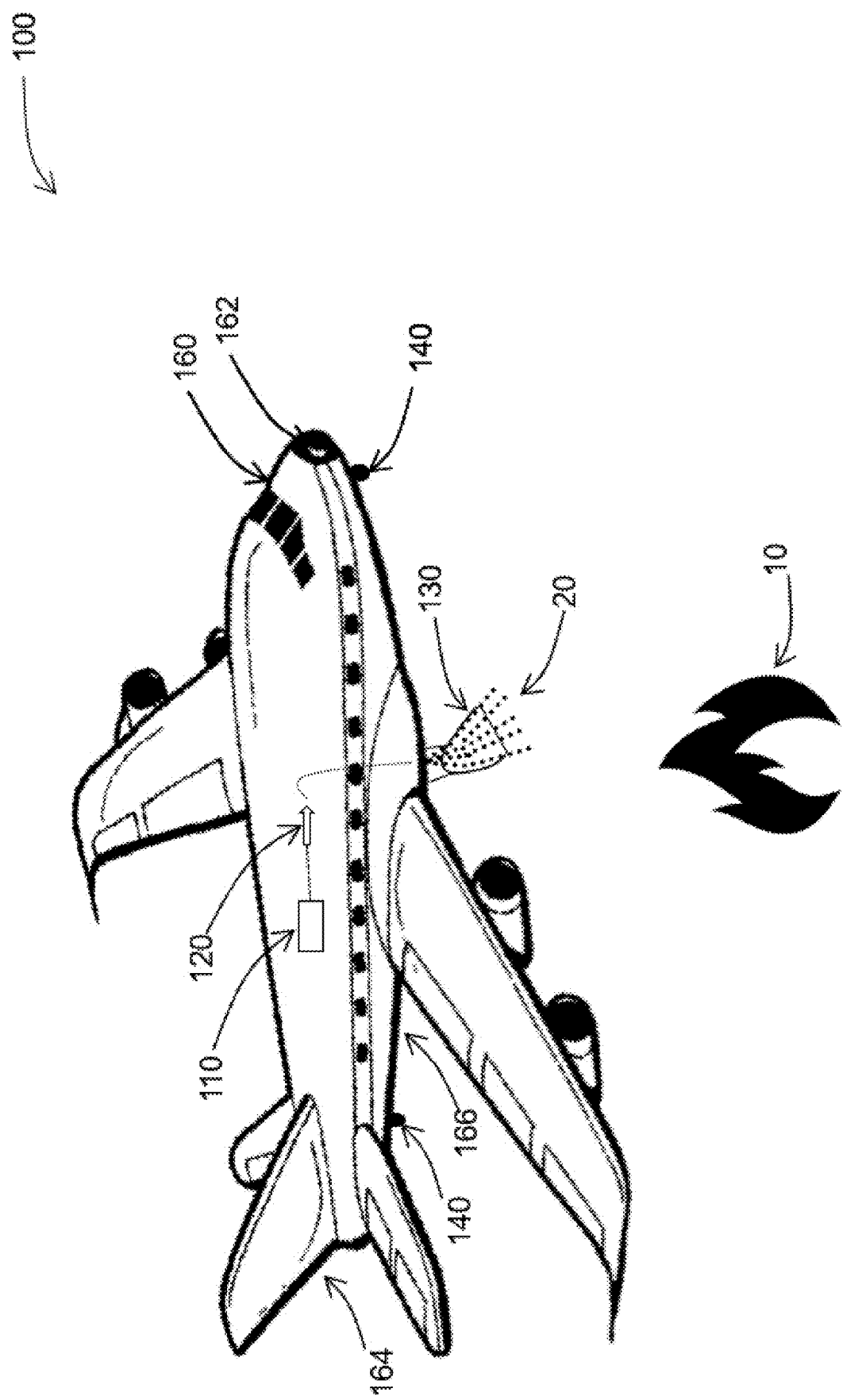
FIG. 2 is a side perspective view of the aircraft of the airborne fire extinguishing system of FIG. 1 in an in-use condition, according to an embodiment of the present disclosure.

FIG. 1 shows a flowchart of the airborne fire extinguishing system 100 and FIG. 2 shows the system 100 during an 'in-use' condition 50, according to an embodiment of the present disclosure. Here, the airborne fire extinguishing system 100 may be beneficial for use to extinguish a fire from the air. As illustrated, the airborne fire extinguishing system 100 may include fluid reservoir 110, flow control valve 120, deflector 130, and at least one infrared camera 140. Fluid reservoir 110 is configured to contain fire extinguishing agent 20. Flow control valve 120 is configured to regulate flow 15 of fire extinguishing agent 20 from fluid reservoir 110. Preferably, fire extinguishing agent 20 is water for ease of filling and ready accessibility. Flow control valve 120 is adjustable; flow control valve 120 being configured to control fluid flow rate 121. Fluid flow rate 121, regulated by fluid control valve, is configured to control delivery rate 122 of fire extinguishing agent 20. Flow control valve 120 is selected from a group consisting of a ball valve, a butterfly valve, and a needle valve. Deflector 130 is configured to dispense fire extinguishing agent 20 in controlled manner over fire 10. Deflector 130 is adjustable, deflector 130 being configured to control spray pattern 131. At least one infrared camera 140 is configured to generate thermographic image 141 using infrared radiation 142 produced by fire 10; thermographic image 141 is configured to influence control of flow control valve 120 and deflector 130.

Upon reading this specification, it should be appreciated that, under appropriate circumstances, considering such issues as user preferences, design preference, structural requirements, marketing preferences, cost, available materials, technological advances, etc., other fluid dispensing arrangements such as, for example, various deflector designs, alternative placement of infrared cameras, variations in automated control techniques, different valving, use of different sensors, etc., may be sufficient.

According to one embodiment, the airborne fire extinguishing system 100 may be arranged as a kit 105. In particular, the airborne fire extinguishing system 100 may further include a set of instructions 107. The instructions 107 may detail functional relationships in relation to the structure of the airborne fire extinguishing system 100 such that the airborne fire extinguishing system 100 can be used, maintained, or the like, in a preferred manner. The present invention may be retro-fit to virtually any aircraft 160.

FIG. 2 shows the airborne fire extinguishing system 100 of FIG. 1, according to an embodiment of the present disclosure. As above, the airborne fire extinguishing system 100 may include fluid reservoir 110, flow control valve 120, deflector 130, and at least one infrared camera 140. Airborne fire extinguishing system 100 further includes an aircraft 160 containing fluid reservoir 110, flow control valve 120, deflector 130, and at least one infrared camera 140, aircraft 160 being configured to disperse fire extinguishing agent 20 over fire 10 while airborne. At least one infrared camera 140 is preferably disposed on underside 166 of aircraft 160. At least one of at least one infrared camera 140 may be disposed on nose 162 of aircraft 160. At least one of at least one infrared camera 140 may be disposed on tail 164 of aircraft 160.

FIG. 3 is a perspective view of the process control system 145 of the airborne fire extinguishing system of FIG. 1, according to an embodiment of the present disclosure. Process control system 145 is configured to automatically adjust fluid flow rate 121 of flow control valve 120 and spray pattern 131 of deflector 130 in response to at least one measured variable 146. At least one measured variable 146 includes one or more of an aircraft altitude, an aircraft speed, a fire size, and a fire intensity. At least one infrared camera 140 is integrated into process control system 145, at least one infrared camera 140 being configured to detect at least one measured variable 146, and to produce feedback signal 147. Airborne fire extinguishing system 100 further includes monitor 148 configured to display thermographic image 141; thermographic image 141 being derived from feedback signal 147; thermographic image 141 being configured to convey location 14 of heat concentration 16 to pilot operating aircraft 160 (FIG. 2).

FIG. 4 is a perspective view of the airborne fire extinguishing system 100 of FIG. 1, according to an embodiment of the present disclosure. Fluid flow rate 121 of flow control valve 120 and spray pattern 131 of deflector 130 are adjusted such that one hundred percent of fire extinguishing agent 20 is vaporized above base 12 of fire 10; fire extinguishing agent 20 being configured to smother fire 10 once vaporized by displacing oxygen available to fire 10. In some embodiments, the deflector comprises an aluminum shield having a width equal to the diameter of the flow control valve.

FIG. 5 is a flow diagram illustrating a method for extinguishing a fire from an aircraft 500, according to an embodiment of the present disclosure. In particular, the method for extinguishing a fire from an aircraft 500 may include one or more components or features of the airborne fire extinguishing system 100 as described above and may include the steps of: step one 501, providing an airborne fire extinguishing system for dispensing a fire extinguishing agent over a fire comprising: a fluid reservoir for containing the fire extinguishing agent, a flow control valve for regulating a flow of the fire extinguishing agent from the fluid reservoir, a deflector for dispensing the fire extinguishing agent in a controlled manner over the fire, at least one infrared camera, and an aircraft containing the fluid reservoir, the flow control valve, the deflector, and the at least one infrared camera; step two 502, generating an infrared image from the infrared camera and displaying it to a pilot of the aircraft to identify a heat concentration as a target; step three 503, directing the aircraft to the heat concentration; step four 504, dispersing the fire extinguishing agent from the deflector over a fire, such that the fire extinguishing agent is concentrated sufficiently to vaporize above a base of the fire; step five 505, vaporizing the fire extinguishing agent above the base of the fire; step six 506, removing a concentration of oxygen from above the fire by displacing it with a vapor produced by the fire extinguishing agent; and step seven 507, smothering and extinguishing the fire.

It should be noted that the steps described in the method of use can be carried out in many different orders according to user preference. The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for extinguishing a fire from an aircraft, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An airborne fire extinguishing system for dispensing a fire extinguishing agent over a fire, the system comprising:
   a fluid reservoir for containing the fire extinguishing agent;
   a flow control valve for regulating a fluid flow rate of the fire extinguishing agent from the fluid reservoir;
   a deflector for dispensing the fire extinguishing agent, wherein the deflector is an angled shield that receives the fire extinguishing agent thereon and diverts the fire extinguishing agent forming a spray pattern;
   wherein the deflector is adjustable and configured to control the spray pattern by selectively angling the deflector relative to the fire extinguishing agent exiting the fluid reservoir;
   a first infrared camera configured to generate a thermographic image using infrared radiation produced by the fire;

wherein the airborne fire extinguishing system is adapted to transition between an inactive configuration and an active configuration, wherein the active configuration the fire extinguishing agent is being dispensed and the flow control valve is open;

a process control system operably connected to the first infrared camera, the flow control valve, and the deflector, wherein the process control system is configured to automatically control the flow control valve to adjust the fluid flow rate and to automatically control an angle of the deflector to adjust the spray pattern in response to a first measured variable detected by the infrared radiation produced by the fire and a second measured variable during the active configuration such that the airborne fire extinguishing system maintains the active configuration;

wherein the second measured variable includes one or more of an aircraft speed and aircraft altitude.

2. The airborne fire extinguishing system of claim 1, wherein the fluid flow rate regulated by the fluid control valve is configured to control a delivery rate of the fire extinguishing agent.

3. The airborne fire extinguishing system of claim 1, wherein the first infrared camera is configured to produce a feedback signal that generates the thermographic image.

4. The airborne fire extinguishing system of claim 3, further comprising an aircraft containing the fluid reservoir, the flow control valve, the deflector, and the first infrared camera, the aircraft being configured to disperse the fire extinguishing agent over the fire while airborne.

5. The airborne fire extinguishing system of claim 4, wherein the first infrared camera is disposed on a nose of the aircraft and a second infrared camera is disposed on a tail of the aircraft.

6. The airborne fire extinguishing system of claim 4, further comprising a monitor configured to display the thermographic image, the thermographic image being derived from the feedback signal, the thermographic image being configured to convey a location of a heat concentration to a pilot operating the aircraft.

7. The airborne fire extinguishing system of claim 1, wherein the fluid flow rate of the flow control valve and the spray pattern of the deflector are adjusted such that the deflector is configured to deflect a stream of fluid in a dispersed pattern such that it vaporizes above the fire base.

8. The airborne fire extinguishing system of claim 1, wherein the flow control valve is selected from a group consisting of a globe valve, a ball valve, a butterfly valve, and a needle valve.

9. The airborne fire extinguishing system of claim 1, wherein the fire extinguishing agent is water.

10. The airborne fire extinguishing system of claim 1, wherein the first infrared camera is configured to determine a temperature of the fire and a second infrared camera is configured to determine an output flow rate of the deflector.

11. The airborne fire extinguishing system of claim 10, wherein the first infrared camera is disposed on a nose of the aircraft.

12. The airborne fire extinguishing system of claim 10, wherein a second infrared camera is disposed on a tail of the aircraft.

13. The airborne fire extinguishing system of claim 12, further comprising a set of instructions; and wherein the airborne fire extinguishing system is arranged as a kit.

14. The airborne fire extinguishing system of claim 1, wherein the process control system adjusts a hydraulic opener, the process control system being configured to adjust an output flow rate of the deflector in response to the temperature of the fire.

15. The airborne fire extinguishing system of claim 1, wherein the shield having a width equal to a diameter of the flow control valve.

16. The airborne fire extinguishing system of claim 1, further including a hydraulic actuator configured to adjust the angle of the deflector relative to the flow control valve.

17. The airborne fire extinguishing system of claim 1, wherein the deflector is aluminum.

18. An airborne fire extinguishing system with infrared imaging comprising:

a fluid reservoir for containing a fire extinguishing agent;

a flow control valve for regulating a flow of the fire extinguishing agent from the fluid reservoir;

a deflector for dispensing the fire extinguishing agent in a controlled manner over the fire, wherein the deflector is an angled shield that receives the fire extinguishing agent thereon and diverts the fire extinguishing agent forming a spray pattern;

wherein the deflector is adjustable and configured to control the spray pattern by selectively angling the deflector relative to the fire extinguishing agent exiting the fluid reservoir;

at least one infrared camera configured to generate a thermographic image using infrared radiation produced by the fire, wherein the thermographic image is configured to influence the control of the flow control valve and the deflector;

wherein the flow control valve is adjustable, the flow control valve being configured to control a fluid flow rate;

wherein the fluid flow rate regulated by the fluid control valve is configured to control a delivery rate of the fire extinguishing agent;

wherein the airborne fire extinguishing system is adapted to transition between an inactive configuration and an active configuration, wherein the active configuration the fire extinguishing agent is being dispensed and the flow control valve is open;

a process control system operably connected to the at least one infrared camera, the flow control valve, and the deflector, wherein the process control system is configured to automatically the process control system is configured to automatically control the flow control valve to adjust the fluid flow rate and to automatically control an angle of the deflector to adjust the spray pattern in response to a first measured variable detected by the infrared radiation produced by the fire and a second measured variable during the active configuration such that the airborne fire extinguishing system maintains the active configuration;

wherein the second measured variable includes one or more of an aircraft speed and aircraft altitude;

wherein the at least one infrared camera configured to produce a feedback signal;

wherein the deflector is configured to deflect a stream of fluid in a dispersed pattern such that it vaporizes above the fire base;

wherein the airborne fire extinguishing system with infrared imaging further comprises an aircraft containing the fluid reservoir, the flow control valve, and the deflector, and the at least one infrared camera, the aircraft being configured to disperse the fire extinguishing agent over the fire while airborne;

wherein the at least one infrared camera is disposed on an underside of the aircraft;

wherein the airborne fire extinguishing system with infrared imaging further comprises a monitor configured to display the thermographic image, the thermographic image being derived from the feedback signal, the thermographic image being configured to convey a location of a heat concentration to a pilot operating the aircraft; and wherein the fire extinguishing agent is water.

19. A method of extinguishing a fire from an aircraft, the method comprising the steps of:

providing an airborne fire extinguishing system for dispensing a fire extinguishing agent over a fire, the system comprising:
- a fluid reservoir for containing the fire extinguishing agent;
- a flow control valve for regulating a flow of the fire extinguishing agent from the fluid reservoir;
- a deflector for dispensing the fire extinguishing agent in a controlled manner over the fire, wherein the deflector is an angled shield that receives the fire extinguishing agent thereon and diverts the fire extinguishing agent forming a spray pattern;
- wherein the deflector is adjustable and configured to control the spray pattern by selectively angling the deflector relative to the fire extinguishing agent exiting the fluid reservoir;
- at least one infrared camera;
- an aircraft containing the fluid reservoir, the flow control valve, the deflector, and the at least one infrared camera;
- wherein the airborne fire extinguishing system is adapted to transition between an inactive configuration and an active configuration, wherein the active configuration the fire extinguishing agent is being dispensed and the flow control valve is open;
- a process control system operably connected to the at least one infrared camera, the flow control valve, and the deflector, wherein the process control system is configured to automatically control the flow control valve to adjust the fluid flow rate and to automatically control an angle of the deflector to adjust the spray pattern in response to a first measured variable detected by an infrared radiation produced by the fire and a second measured variable during the active configuration such that the airborne fire extinguishing system maintains the active configuration;
- wherein the second measured variable includes one or more of an aircraft speed and aircraft altitude;

generating an infrared image from the infrared camera and displaying it to a pilot of the aircraft to identify a heat concentration as a target;

directing the aircraft to the heat concentration;

dispersing the fire extinguishing agent from the deflector over a fire, such that the fire extinguishing agent is concentrated sufficiently to vaporize above a base of the fire;

vaporizing the fire extinguishing agent above the base of the fire;

removing a concentration of oxygen from above the fire by displacing it with a vapor produced by the fire extinguishing agent; and smothering and extinguishing the fire.

* * * * *